United States Patent [19]
Lampert

[11] Patent Number: 6,104,856
[45] Date of Patent: Aug. 15, 2000

[54] OPTICAL AIR-GAP ATTENUATOR

[75] Inventor: Norman Roger Lampert, Norcross, Ga.

[73] Assignee: Lucent Technologies Inc., Murray Hill, N.J.

[21] Appl. No.: 09/098,276

[22] Filed: Jun. 16, 1998

[51] Int. Cl.[7] .................................................. G02B 6/38
[52] U.S. Cl. .......................... 385/140; 385/135; 385/136; 385/139
[58] Field of Search .............................. 385/140, 55, 56, 385/59, 60, 71, 75, 76, 135, 136, 139

[56] References Cited

U.S. PATENT DOCUMENTS

| | | | |
|---|---|---|---|
| 4,257,671 | 3/1981 | Barbaudy et al. | 350/96.15 |
| 4,261,640 | 4/1981 | Stankos et al. | 350/96.15 |
| 4,615,581 | 10/1986 | Morimoto | 350/96.21 |
| 4,717,234 | 1/1988 | Barlow et al. | 350/96.21 |
| 4,787,700 | 11/1988 | Yin | 350/96.21 |
| 4,900,124 | 2/1990 | Lampert et al. | . |
| 5,082,345 | 1/1992 | Cammons et al. | 385/60 |
| 5,136,681 | 8/1992 | Takahshi | 350/40 |
| 5,274,729 | 12/1993 | King et al. | 385/134 |
| 5,384,885 | 1/1995 | Diner | 385/140 |
| 5,432,880 | 7/1995 | Diner | 385/85 |
| 5,579,425 | 11/1996 | Lampert et al. | 385/59 |
| 5,619,610 | 4/1997 | King et al. | 385/139 |
| 5,638,474 | 6/1997 | Lampert et al. | 385/78 |
| 5,647,043 | 7/1997 | Anderson et al. | 385/55 |
| 5,719,977 | 2/1998 | Lampert et al. | 385/60 |
| 5,923,805 | 7/1999 | Anderson et al. | 385/86 |

FOREIGN PATENT DOCUMENTS 0341919  5/1989  European Pat. Off. .

OTHER PUBLICATIONS

"Variable Attenuator Connector", Johanson Fiber Optic Group Product Brochure, Feb. 1995.
"72 Series Singlemode Attenuators," Storm Products Company Product Brochure, Aug, 1992.
"71 Series Singlemode Adaptors," Storm Products Company Product Brochure, Aug. 1992.
"Attenuator," Sieko Instruments & Electronics Ltd. Product Brochure.

*Primary Examiner*—Cassandra Spyrou
*Assistant Examiner*—Mohammad Y. Sikder
*Attorney, Agent, or Firm*—Michael A. Morra

[57] ABSTRACT

An optical adapter 100 includes a pair of cylindrical ferrules 121, 122, each containing an optical fiber disposed along its central axis 101—101. The ferrules are aligned with their central axes being collinear. Moreover, the ferrules are captured within a plastic housing that comprises a plug member 110 and a jack member 140. These members interlock with each other to form an adapter that can be used, for example, for attenuating an optical signal or for interconnecting two ferrules having different diameters. Preferably, the ferrules are identical to each other. Each ferrule includes an optical fiber that is disposed in a bore, which extends along the central axis of the ferrule between its opposite ends, and each ferrule has an end face 126 that is angled at about 82 degrees with respect to the central axis. In one embodiment, the angled end faces of the ferrules are in direct contact with each other and attenuation is determined by the optical path length between the centers of the angled end faces, which is a function of the axial rotation of the ferrules with respect to each other. In another embodiment, the angled end faces of the ferrules are in contact with opposite sides of a spacer 170 so that attenuation is a function of the spacer's thickness and the axial rotation of the ferrules with respect to each other. Such a design enables precision optical attenuators to be fabricated. Wavelength division multiplexing systems are improved by the use of such precision optical attenuators at the inputs of the multiplexer 200 and/or the outputs of the demultiplexer 500.

2 Claims, 7 Drawing Sheets

OPTICAL AIR-GAP ATTENUATOR

CROSS REFERENCE TO RELATED APPLICATIONS

This invention is related to application Ser. No. 09/097,620 (M. G. Deveau 1-27) entitled Optical Adapter Including A Ferrule Assembly, which is being filed concurrently with this patent application.

TECHNICAL FIELD

This invention relates to an optical fiber connecting device including an attenuator and, more particularly, to the design of an optical attenuator.

BACKGROUND OF THE INVENTION

Fiber-optic telecommunication networks are constantly being upgraded to carry more and more channels over a single optical fiber. And while fiber manufacturers may not applaud this trend because it decreases the demand for optical fiber, it clearly signals the direction of this industry. Indeed, Lucent Technologies Inc. recently announced an optical system having over 100 channels, each transmitting 10 gigabits of data at a different wavelength, over a distance of nearly 250 miles (400 km) using its TrueWave200 fiber. This represented the world's first long-distance, error-free transmission of a terabit (1 trillion bits) of information per second over a single strand of optical fiber. Associated with such multi-channel optical systems are wavelength division multiplexers (WDM), which operate to combine a number of separate and distinct wavelength regions (channels) onto a single optical fiber in one direction of transmission, and to separate them from the optical fiber in the other. This is to say that the WDM operates as multiplexer in one direction of transmission, and as a demultiplexer in the other. These channels each have a different central wavelength (i.e., $\lambda_1$, $\lambda_2, \ldots \lambda_n$) and, for optimum performance of the WDMs and associated transmitters and receivers, it is important that the optical signal power of each channel be precisely controlled, and preferably equal to all others.

Known optical attenuators are generally expensive and have unacceptably large variation between supposedly equal units. Large variations exist when the attenuators leave the manufacturer, and variations even occur during the life of an attenuator that degrade the quality of an optical transmission system. Additionally, many known attenuators are unable to handle high optical power levels without damage.

One of the limitations encounter by optical fiber systems relates to optical noise. A common source of optical noise is optical power reflections. Optical power reflection generally occurs at any discontinuity in a fiber optical transmission path, including the end of an optical fiber, and causes a portion of the incident light to travel back toward the source. Optical power reflected in this manner may reflect again when it arrives at the source point or other points of discontinuity in the system, adding an unwanted noise component to the signal. Optical power that is reflected back into a source can also corrupt the fundamental operation of the source, typically a laser.

Low reflectance attenuators are known in the art and one is described in U.S. Pat. Nos. 5,082,345 and 5,274,729 in which an attenuator disc, made from polymethylmethacrylate (PMMA) plastic, is slidably suspended from a longitudinal slot in an alignment sleeve. Spring-loaded optical plugs are inserted into opposite ends of the sleeve and engage opposite sides of the disc to provide between 5 and 20 dB of attenuation depending on thickness. However, it becomes increasingly heroic to manufacture a disc whose thickness is less than about 0.2 mm, where the insertion loss is about 5 dB.

Another known optical attenuator comprises a length of doped optical fiber that is more lossy than conventional optical fiber. However, the insertion loss of such doped fiber is about 10 dB/cm, and the loss is not uniform over an entire spool. As a result, measurements are tedious and the ability to fabricate attenuators to within ±0.5 dB of a desired value is not practical.

Variable Attenuator Connectors (VACs) are known that combine connector and attenuator functions. In such VACs, a finely machined self-locking lead screw mechanism enables linear motion of the connector ferrule, and this creates an air gap (hence attenuation) between plug connectors. In effect, the ferrule within the VAC is being withdrawn from contact with the ferrule of another plug connector. The level of attenuation is set by rotating a nut at the end of the VAC. Back reflection is reduced when the end faces of the mating ferrules are cleaved at an angle. One such device is commercially available from Johanson Manufacturing Corporation. However, the air-gap separation between mating ferrules is subject to variation due to vibration and creep. Even small variations in air-gap separation cause substantial changes in attenuation (e.g., the optical signal power doubles if the air gap decreases by about 50 microns).

Accordingly, what is desired is an optical attenuator that can be inexpensively manufactured with high precision (e.g., within 15% of its nominal value) over a wide range of attenuation levels (e.g., between 0 and more than 20 dB), and whose attenuation level does not vary when subjected to vibrations. Moreover, it is desirable that the optical attenuator be able to withstand high optical power levels (e.g., more than 20 dbm) without damage. Finally, it is desirable to provide an optical attenuator that is suitable for use in a WDM system where precise amounts of insertion loss (attenuation) are needed for optimum performance of its associated multiplexers, demultiplexers, transmitters and receivers.

SUMMARY OF THE INVENTION

An optical attenuator includes a pair of cylindrical ferrules that are aligned end-to-end with an air gap therebetween. Each ferrule is equipped with an optical fiber on its central axis and each ferrule has an end face that is adjacent to the air gap. The end face comprises a generally flat surface that forms an acute angle with respect to its central axis. The angled end faces are either in contact with each other or with opposite sides of a ring-shaped spacer that is installed in the air gap. The angled end faces of the ferrules are held rigidly within an enclosure with their axes collinear and their axial rotation fixed with respect to each other. In such an attenuator, insertion loss is a function of the relative axial rotation of the ferrules and/or the thickness of the spacer.

In an illustrative embodiment of the invention, the end faces of each ferrule form an angle of about 82° with respect to their central axes and, preferably, the ferrules are identical to each other. Also, in an illustrative embodiment of the invention, the enclosure comprises a barrel having a bore that extends between its opposite ends. A cylindrical sleeve is installed within the bore that wraps around the angled end faces of the ferrules to provide axial alignment, although the bore may be formed with suitable accuracy so that the sleeve is unnecessary. Advantageously, the barrel includes a number of flat areas on its outside surface that allow it to be installed in a housing in a number of different axial rotations to accommodate fiber eccentricity (i.e., situations wherein the optical fiber does not reside precisely on the central axis of the ferrule).

Finally, in the illustrative embodiment of the invention, the ferrules are captured within a plastic housing that comprises a plug member and a jack member, which are both molded from thermoplastic material. These members interlock with each other to form an optical adapter.

BRIEF DESCRIPTION OF THE DRAWING

The invention and its mode of operation will be more clearly understood from the following detailed description when read with the appended drawing in which.

DETAILED DESCRIPTION

Figure 1:
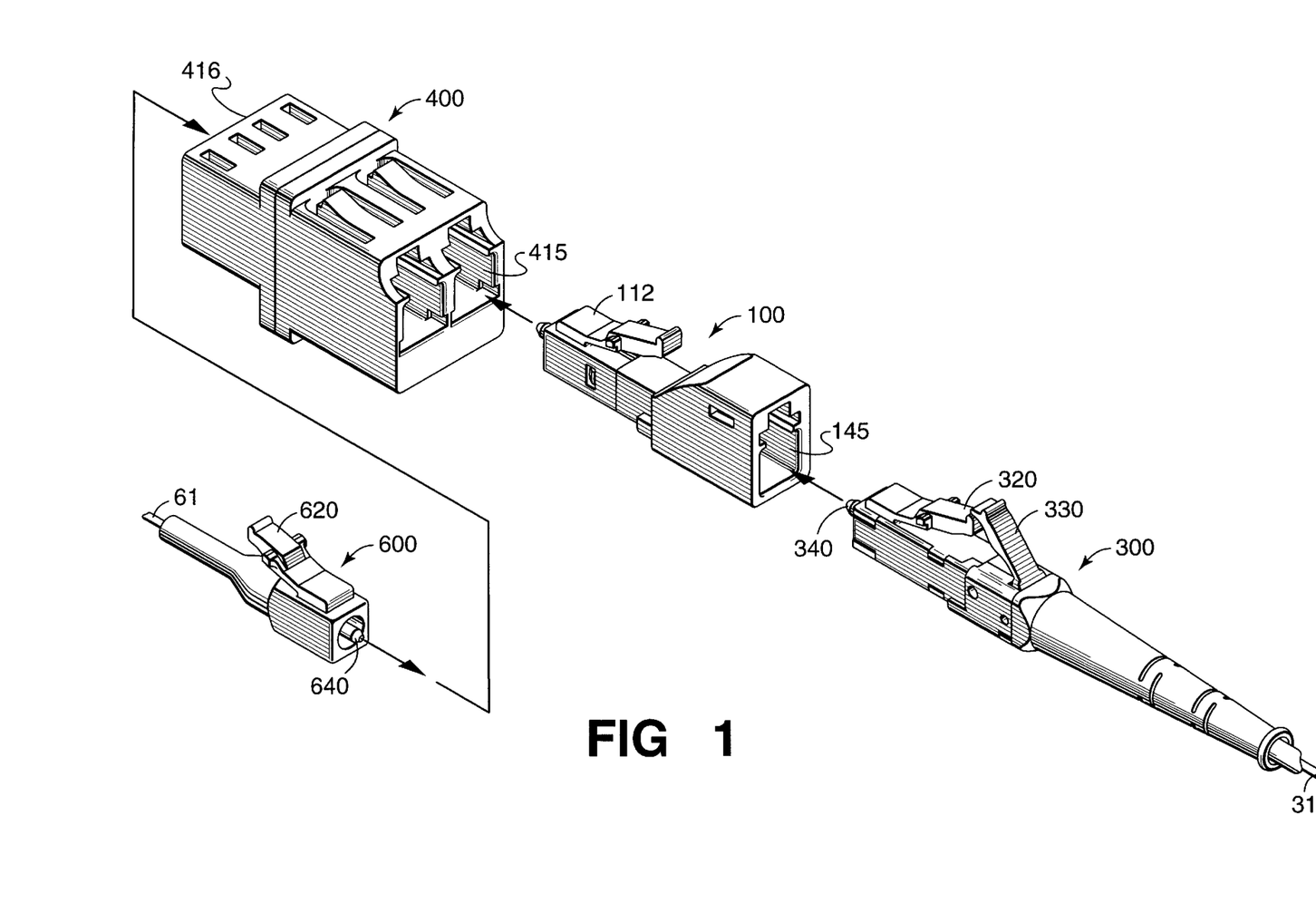
FIG. 1 is a perspective view of an interconnection system for optical fibers, the system includes an optical adapter having an attenuator housed therein.

FIG. 1 is a perspective view of an optical communication system, illustrating various components used for interconnecting a pair of optical fibers 61 and 31. Optical plug connector 600 includes a ferrule 640 that terminates an end portion of optical fiber 61. Illustratively, ferrule 640 can be floating or immovably held within the plug connector 600. An example of an immovably held ferrule is disclosed in U.S. Pat. No. 5,719,977. Plug connector 300 also includes a ferrule 340 that terminates an end portion of optical fiber 31. Illustratively, ferrule 340 is movably held within plug connector 300, which is disclosed in greater detail in U.S. Pat. No. 5,638,474. These plug connectors 300, 600 are adapted to be inserted into a jack connector 400 so that an end-to-end connection between optical fibers 61, 31 can be made. The design of jack connector 400 is disclosed in greater detail in U.S. Pat. No. 5,647,043. Each of the plug connectors 300, 600 includes a latch 320, 620 that is designed to cooperate with retaining ledges (not shown) within the cavities on opposite sides of jack connector 400 so that it can be securely held therein. Plug connector 300 includes a trigger 330, which provides an anti-snag feature and also renders latch 320 more accessible to users, particularly in a small connector. Additionally, plug connector 300 includes a spring 360 (see FIG. 4), which imparts a predetermined force (about 0.5 kgf) in the axial direction onto ferrule 340 so that it will press against ferrule 640 without an air gap. Air gaps are known to cause signal reflections and attenuation in an optical path. And while the present invention uses an air gap to achieve precise attenuation, unintended air gaps are to be avoided.

Nevertheless, in order to simplify the design of optical processing apparatus such as multiplexers and receivers, it is sometimes desirable to introduce attenuation into an optical signal path so that the processing apparatus will be processing optical signals at the most appropriate power level. Accordingly, FIG. 1 also shows an optical adapter 100 that is designed to provide a precise attenuation level. Advantageously, the adapter can be plugged into cavity 415—which accommodates plug connector 300, or the adapter can be plugged into cavity 416—which accommodates plug connector 600. Optical adapter 100 includes a latch 112 that cooperates with a retaining ledge (not shown) within cavities 415, 416 of jack connector 400 so that it can be securely held therein. The optical adapter further includes a cavity 145 for receiving plug connectors 300, 600.

Adapter Construction

Figure 2:
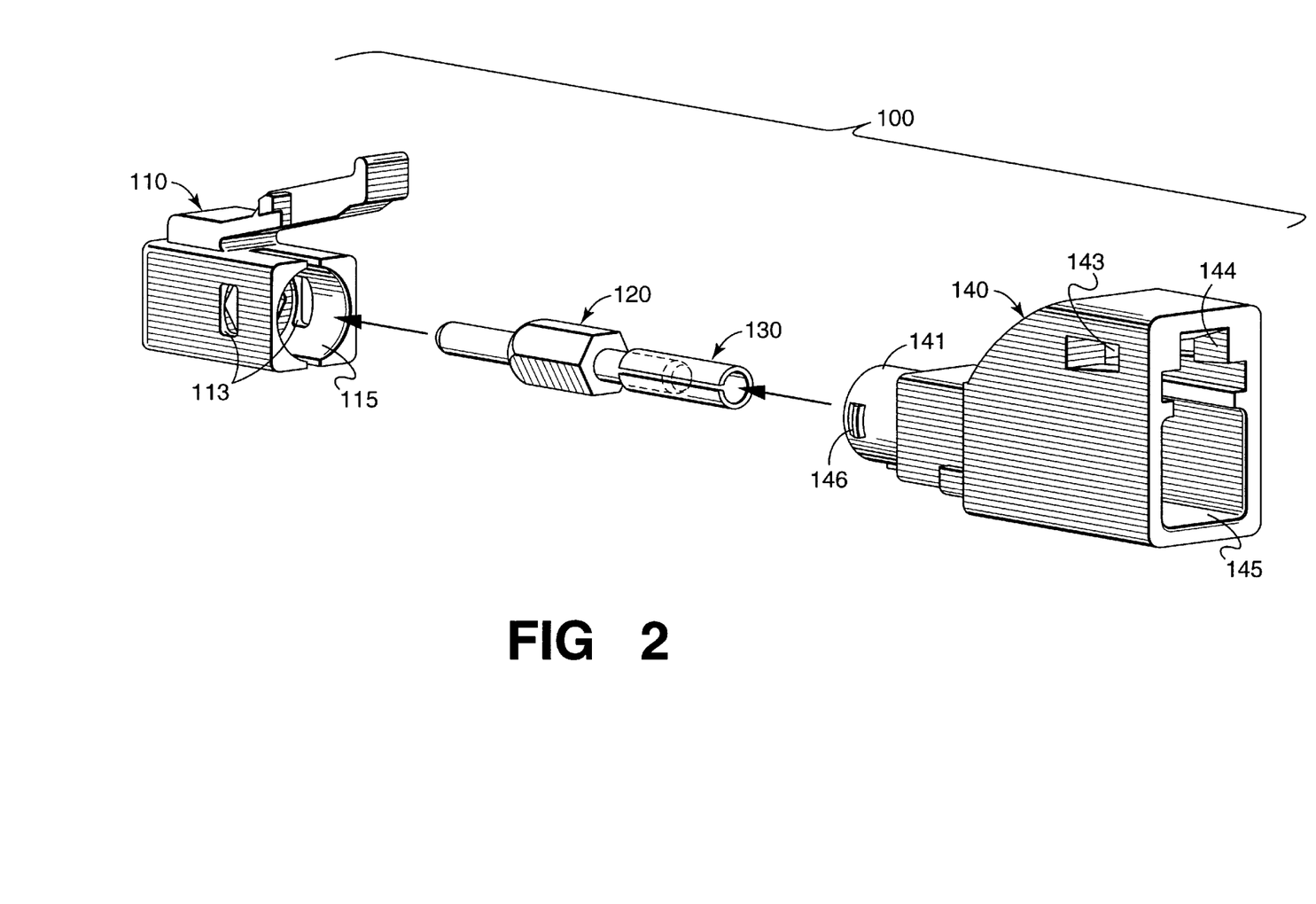
FIG. 2 shows an exploded perspective view of the optical adapter of FIG. 1 as seen from its back end.
Figure 3:
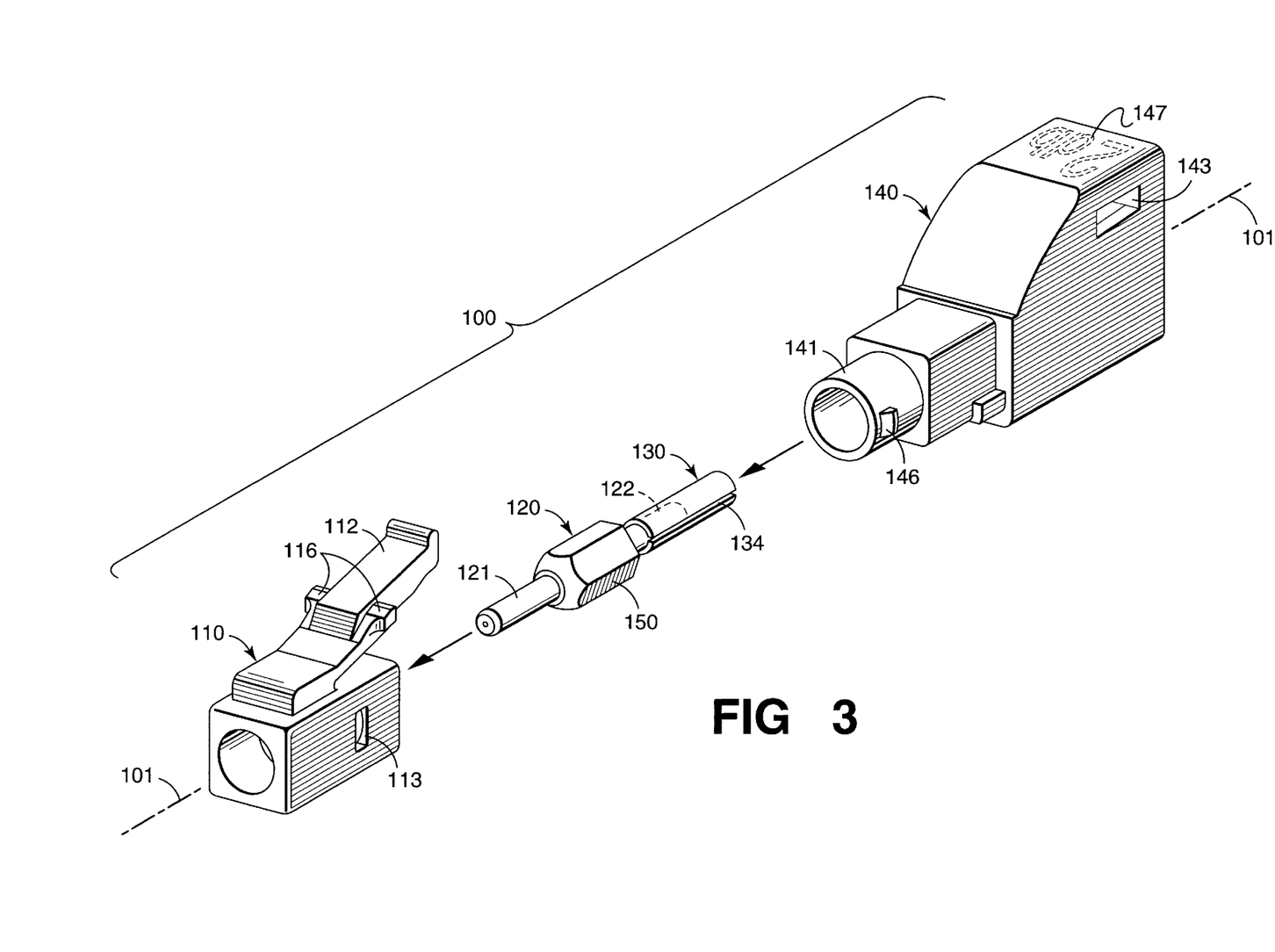
FIG. 3 shows an exploded perspective view of the optical adapter of FIG. 1 as seen from its front end.
Figure 4:
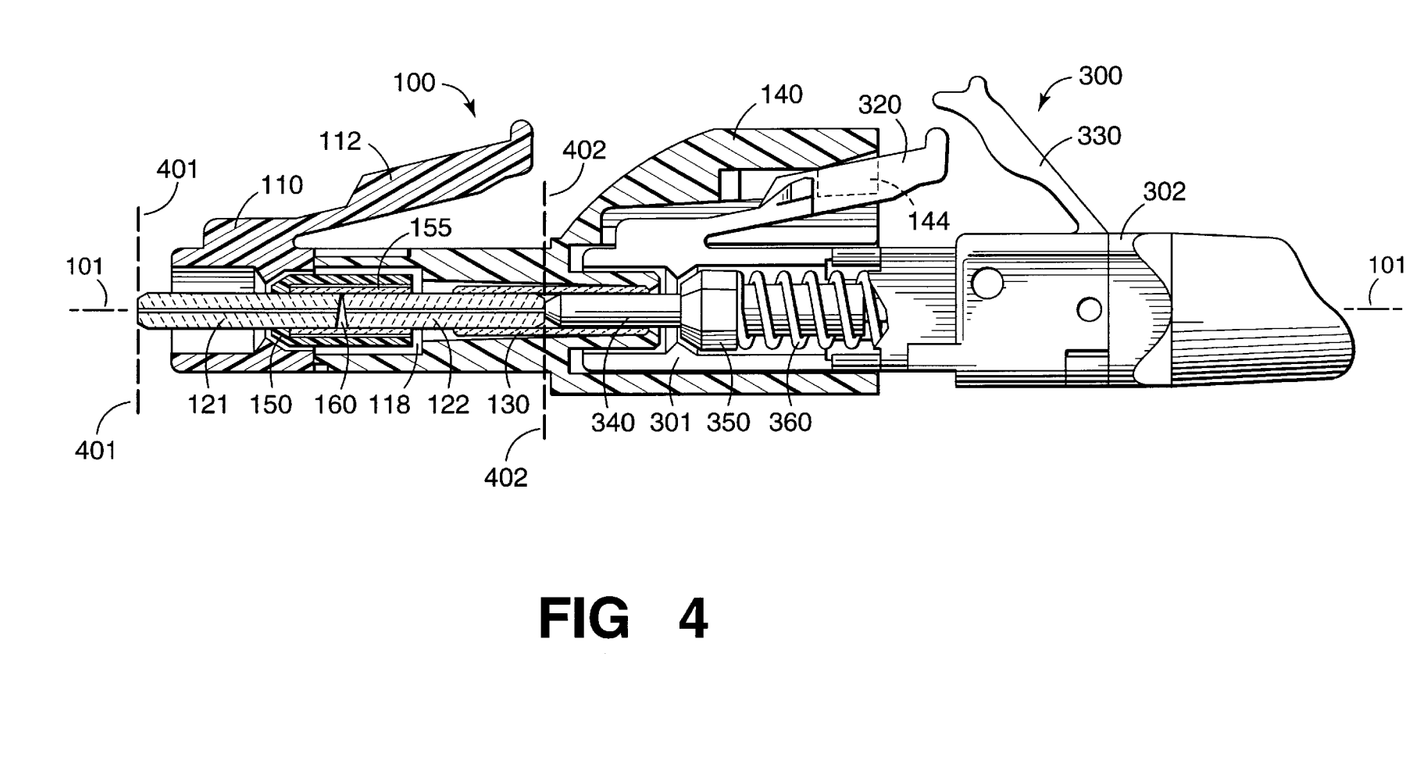
FIG. 4 shows a cross-section view of the interconnection between an optical connector and the optical adapter.

FIGS. 2–4 disclose the design of an optical adapter 100 that is suitable for containing various different ferrule assemblies, which can facilitate the construction of an optical transmission system. For example, one ferrule assembly 120 can provide a specific amount of attenuation of a lightwave signal, as discussed herein, so that optical multiplexing and demultiplexing operations can be carried out with great precision. Another ferrule assembly (not shown) can be used to interconnect optical connectors having different-size ferrules. These and other possibilities are enabled by the disclosed design.

Reference is specifically made to FIGS. 2, 3 that show exploded perspective views of optical adapter 100 as seen from its back and front ends respectively. The adapter 100 includes a ferrule assembly 120, which is captured within a molded-plastic housing that comprises a plug member 110 and a jack member 140. These members interlock with each other to form a single unit. Interlocking is accomplished when a pair of tabs 146 on jack member 140 are mated with a pair of slots 113 on plug member 110. The tabs 146 are positioned on opposite sides of a tubular protrusion 141 at the front end of jack member 140; and the slots 113 are positioned on opposite sides of a tubular opening 115 in the back end of plug member 110. It is noted that while the disclosed plug member 110 and jack member 140 are designed to accommodate LC-type connectors, other connector styles are contemplated such as, for example, FC, ST and SC.

The top-side surface of plug member 110 includes a movable latch 112 having a pair of shoulders 116 that cooperate with mating surfaces on an associated jack connector in order to prevent unintended decoupling between the plug member and the associated jack connector. The plug member 110 and latch 112 are molded from a commodity thermoplastic such as polyetherimide (PEI) in order to achieve a low-cost, lightweight housing. Latch 112 is molded into the plug member 110 and includes a "living" hinge that allows it to be moved up and down in a direction which is perpendicular to a central axis 101 of the adapter 100. In this illustrative embodiment, the plug member 110 has a cross-section dimension of 4.6 by 4.6 millimeters (mm).

In a preferred embodiment of the invention, ferrule assembly 120 includes a pair of cylindrical ferrules 121, 122 that are made from zirconia and held together as a single unit by a coupling apparatus that comprises a barrel 150 and an alignment sleeve 155. Each ferrule includes an optical fiber disposed within a bore that is located on its central axis. The coupling apparatus is used for maintaining the central axes of these ferrules 121, 122 collinear, and for locking them together in a fixed axial rotation with respect to each other, and with an air gap therebetween. Preferably, the barrel 150 is made from stainless steel or nickel-plated brass and has a hexagonal cross section. The hexagonal cross section is a feature that cooperates with the interior shape of the adapter to enable the ferrules to be positioned in any one of six different stable rotational positions. Accordingly, fiber eccentricity can be tuned to minimize coupling loss (e.g., ferrule assembly 120 can be rotated to position the optical fiber within ferrule 121 toward the top side of the adapter 100 when the fiber is not located precisely at the geometric center of ferrule 121). It is understood that a greater or lesser number of features can be used to change the number of stable rotational positions, and that other features such as grooves may be used to achieve the same end.

In the preferred embodiment, the ferrules 121, 122 are identical to each other and have a diameter of 1.25 mm. However, in situations where it is desirable to interconnect an ST connector to an LC connector, for example, one of the ferrules (e.g., 121) would have a 1.25 mm diameter while the other (e.g., 122) would have a 2.50 mm diameter. Indeed, a single ferrule could be fabricated having a common axial bore, but with different outside diameters at its opposite ends to accommodate the interconnection of different-size ferrules.

So that an LC-type plug connector 300 (see FIG. 1) might readily fit into the jack member 140, a suitably shaped cavity 145 is provided. Moreover, a pair of retaining ledges 144 (see FIG. 2) are provided within cavity 145 for interlocking with a latch 320 on plug connector 300. The molding of retaining ledges 144 is facilitated by openings 143 on opposite sides of jack member 140. It is noted that the top-side surface 147 of the jack member 140 is illustratively used for inscribing an indication of the amount of attenuation provided by the ferrule assembly 120 contained within the optical adapter 100.

Finally, the adapter 100 includes a sleeve 130, which facilitates end-to-end connection between ferrule 122 of the ferrule assembly 120, and ferrule 340 of the plug connector 300 (see FIG. 1). The sleeve 130 preferably includes a slit 134, which allows its diameter to vary somewhat in order to accommodate minor differences in ferrule diameters.

FIG. 4 shows a cross-section view of the interconnection between the plug connector 300 and the optical adapter 100 in order to illustrate the cooperation between the various components. These components are shown positioned as though an opposing ferrule were pressing against the front end of ferrule 121, and equilibrium was achieved at optical plane 401. In this situation, optical plane 402 is where equilibrium is achieved between ferrule 122 and ferrule 340.

Plug connector 300 includes molded plastic housing comprising front-end 301 and back end portion 302 that interlock with each other and surround a fiber holding structure, which comprises a base member 350 that is overmolded onto ferrule 340. A helical spring 360 surrounds the back end of the base member and urges it forward (i.e., toward the front of the connector) with a predetermined force. As discussed in connection with FIG. 1, the connector includes a trigger 330 that cooperates with a latch 320 during the installation (removal) of the plug connector 300 into (out of) an associated jack connector. It is noted that an optical fiber extends along the central axis of this entire assembly except for the air-gap region 160 within adapter 100.

Adapter 100 includes a molded plastic housing comprising plug member 110, which includes a latch 112, and jack member 140 that interlock with each other and surround a ferrule assembly, which comprises a pair of ferrules 121, 122 that are surrounded by coupling apparatus 150, 155. Note that the ferrule assembly 120 is capable of longitudinal movement in a cavity formed within housing 110, 140 as illustrated by gap 118. A gap 118 is needed, for example, so that the ferrule assembly is capable of axial movement and transferring force from a plug connector, which has a spring loaded ferrule, to a plug connector that has an immovable ferrule. A gap size of about 1 mm is suitable.

Optical Attenuator

Figure 5:
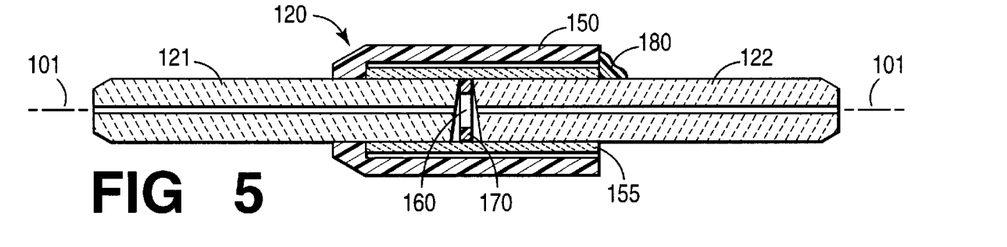
FIG. 5 shows a cross-section view of a ferrule assembly having an air-gap attenuator in accordance with the present invention.
Figure 6:
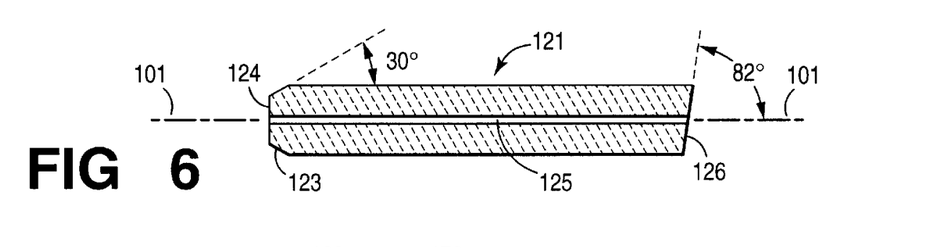
FIG. 6 discloses a cross-section view of one of the ferrules of the assembly hown in FIG. 5, illustrating selected details of its construction.

Reference is made to FIG. 5 and FIG. 6, which show details regarding the construction of an optical attenuator that includes an air-gap region 160. In particular, the attenuator is constructed using a pair of ferrules 121, 122 that are preferably, but not necessarily, identical to each other and molded from zirconia. Each ferrule includes an optical fiber that is disposed within a cylindrical bore 125 that extends between opposite end faces 124, 126 of the ferrule. These ferrules are positioned end-to-end with their central axes collinear so that lightwaves that are traveling along the optical fiber that resides on the central axis of one ferrule 121 will be directed toward the optical fiber that resides on the central axis of the other ferrule 122. Angled end face 126 may be slightly convex having a radius of between 8 and 12 mm. Because such a radius is large in comparison with the diameter of the end face (about 1.25 mm), end face 126 still has a generally flat surface. A ferrule having an end face with such a radius is called a PC (Physical Contact) ferrule. If the end face is angled as well as rounded, then it is called an APC (Angled Physical Contact) ferrule. More importantly, end face 126 forms an acute angle with respect to its central axis 101—101 that serves three significant functions:

(1) the fact that the end faces 126 of both ferrules are angled allows them to be placed in contact with each other for precise and stable control over the optical path length between the centers of the angled end faces by merely rotating one of the ferrules with respect to the other;

(2) an angled end face reduces the amount of power that traverses the air gap along the central axis because light rays emerge at the glass/air boundary at an angle described by Snell's law ($n_1 \sin \phi_1 = n_2 \sin \phi_2$). For an air-gap length of 0.5 mm, an end face having an 82° angle decreases the amount of power that traverses the air gap along the central axis by about 7 dB as compared to an end face having a 90° angle. Accordingly, air-gap attenuators having angled end faces can be smaller (lengthwise) than air-gap attenuators that are not angled; and (3) an angled end face also reduces the amount of power that is reflected back toward the source of power.

Signal reflections present a serious problem in high capacity optical fiber systems because reflected power can interfere with the proper operation of lasers. In the present invention, because the optical fiber is made from glass and because attenuation is accomplished through the use of an air-gap region 160, one would expect a reflection to occur. Reflectance is a function of the index of refraction (n) of the materials at the interface as set forth in the following equation:

$$\text{Reflectance} = -10 \log[(n_0-n_1)^2/(n_0+n_1)^2]$$

For example, in a glass-to-air interface ($n_0 \approx 1.0$ for air, and $n_1 \approx 1.47$ for glass) the reflectance is $-14.7$ dB, which is much too high. However, by directing the reflected optical power away from the central axis of the glass fiber, the amount of power reflected toward the source is sharply reduced. It has been found that acute angles between 79 and 85 degrees (preferably 82 degrees where reflectance is about $-60$ dB) with respect to the central axis 101—101 provide suitable reduction in reflected signal power. It is noted that the overall reflection includes one that occurs when lightwaves emerge from the angled end face of one ferrule where the refractive index changes from about 1.47 to about 1.0. As discussed above, this is about $-60$ dB; although other downstream reflections may be more significant.

As discussed above and shown in FIG. 5, ferrules 121, 122 are substantially identical to each other, and are positioned with their angled end faces 126 facing each other with an air-gap region 160 between them. In the present invention, the air separation between the angled end faces 126 is zero at one point. At the center of the air-gap region 160, the optical path length between the centers of the angled end faces 126 is controlled by the relative rotation of the ferrules 121, 122 with respect to each other, and by the thickness of a ring-shaped spacer 170 that resides within the air-gap region 160 in certain embodiments.

Figure 9:
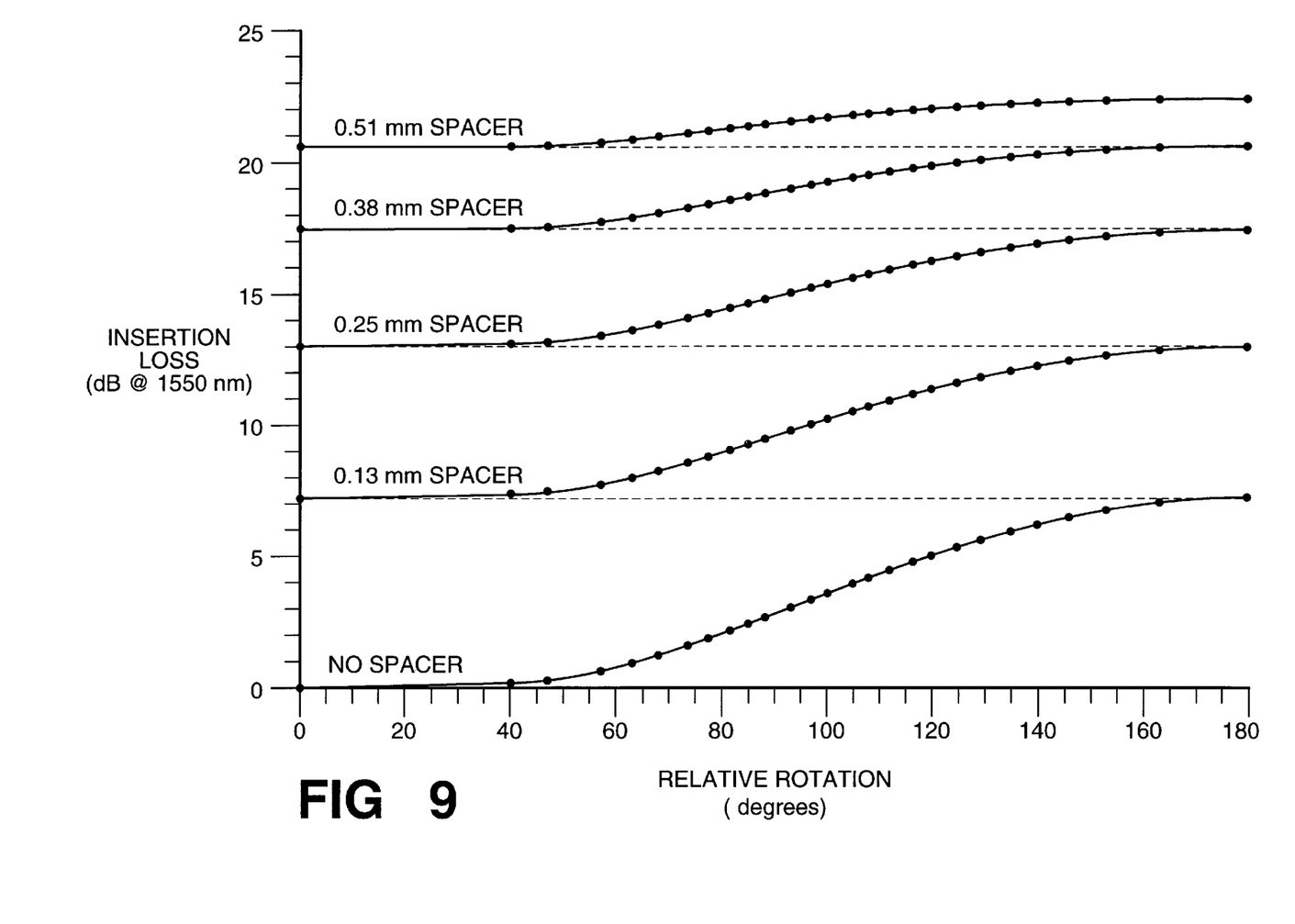
FIG. 9 shows the insertion loss characteristic of the air-gap attenuator of the present invention for different relative rotations between the ferrules, and for different spacer thickness.

In one embodiment, the angled end faces 126 of the ferrules are in direct contact with each other. Such contact improves the stability of the attenuator because it prevents the optical path length between the centers of the angled end faces 126 from ever becoming smaller as a result of handling or vibrations during actual use. In this embodiment, this optical path length is only a function of the axial rotation of the ferrules with respect to each other. See, for example the lowest curve in FIG. 9 where insertion loss varies from zero to about 7 dB as the relative rotation varies from zero to 180°. The graphs of FIG. 9 are for APC end faces (10–12 mm radius); however, for absolutely flat end faces 126, the insertion losses will be greater.

Figure 8:
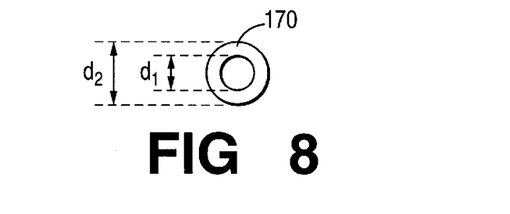
FIG. 8 discloses a ring-shaped spacer that is used in some embodiments of the air-gap attenuator.

In another embodiment, the spacer 170 is inserted in the air-gap region 160 between the angled end faces of the ferrules 121, 122 to increase the length of the air-gap region 160 by a discrete amount. Here, the angled end faces 126 of the ferrules 121, 122 are in contact with opposite sides of the same spacer 170. Such contact improves the precision of the attenuator as discussed above. Although spacer 170 is preferably a ring-shaped flat disc, as shown in FIG. 8, it is understood that other shapes are contemplated so long as they include a suitably large opening at the center for light transmission. Spacer 170 is preferably made from zirconia or stainless steel, and has an outer diameter $d_2$, which is approximately equal to the diameter of the smallest ferrule (illustratively 1.25 mm) and an inner diameter $d_1$, which allows light to be transmitted across air-gap region 160 between ferrules 121, 122 without interference (illustratively 0.5 mm). In this embodiment, the length of air-gap region 160 is a function of the axial rotation of the ferrules with respect to each other and a function of the thickness of the spacer 170. See, for example, the top four curves of FIG. 9 where insertion loss of the attenuator varies from about 7 dB (when the relative rotation is zero degrees and the spacer thickness is about 0.13 mm) to about 22 dB (when the relative rotation is 180° and the spacer thickness is about 0.50 mm).

Construction of ferrule assembly 120 illustratively proceeds by press fitting or bonding ferrule 121 into the bore at one end of barrel 150 until only a predetermined amount extends outward. One end of a cylindrical alignment sleeve 155, preferably made from zirconia, is installed onto the back end of ferrule 121. Thereafter, a spacer 170 is optionally inserted into the cylindrical sleeve alignment for those ferrule assemblies where high levels of insertion loss are sought. The back end of ferrule 122 is then inserted into the other end of alignment sleeve 155; but care is taken not to exceed a limited force (about 0.5 kgf) so that the angled end faces 126 of the ferrules 121, 122 will not be damaged. Ferrule 122 is now rotated until a desired amount of attenuation is achieved, and then epoxy 180 is applied to bond it to the coupling apparatus 150, 155. A suitable 2-part epoxy is Hysol 0151, which is commercially available from the Dexter Corporation. It is understood that the diameter of the bore through the barrel 150 can be sized to avoid the need for an alignment sleeve 155. Ferrules 121, 122 preferably include a 30° chamfer 123 at their front ends 124, which are slightly convex (e.g., with a radius between 7 and 30 mm) and may be angled.

Figure 7A:
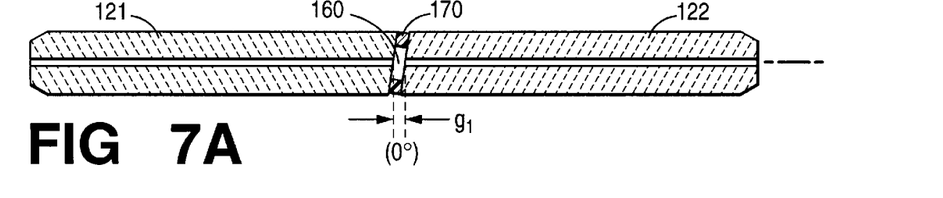
FIGS. 7A–7C show various rotational orientations of a pair of ferrules used in constructing the air-gap attenuator of the present invention.
Figure 7B:
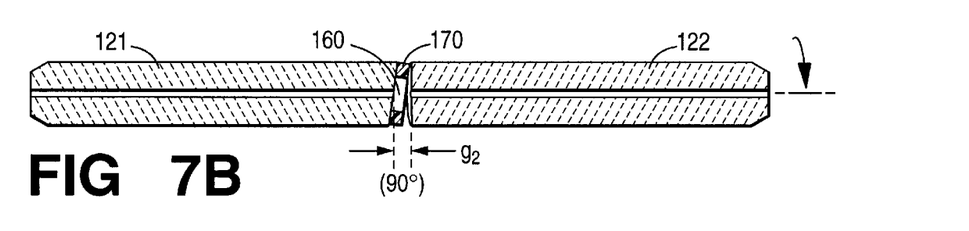
Figure 7C:
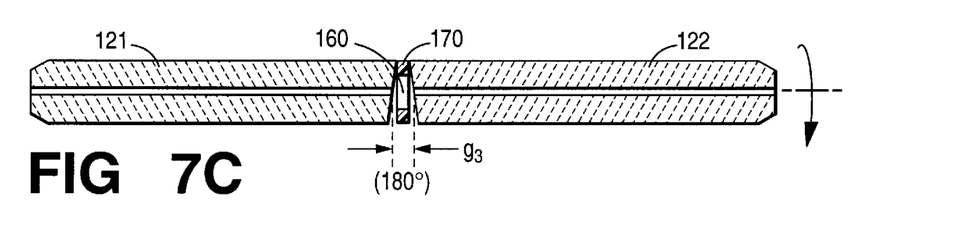

FIGS. 7A–7C show various rotational orientation of ferrules 121, 122 with a spacer 170 installed in the air-gap region 160 between ferrules. In FIG. 7A, the gap ($g_1$) between ferrule centers is equal to the thickness of the spacer 170 because the relative rotation is zero degrees and the angled end faces reside in planes that are parallel to each other. In FIG. 7B, the ferrules are rotated one-quarter turn (90°) with respect to each other which causes the length of the gap ($g_2$) between ferrule centers to be increased by about 0.05 mm over the thickness of the spacer (assuming that the ferrules each have an outside diameter of about 1.25 mm). In FIG. 7C, the ferrules are rotated one-half turn (180°) with respect to each other which causes the length of the gap ($g_3$) between ferrule centers to be increased by about 0.13 mm over the thickness of the spacer (assuming that the ferrules each have an outside diameter of about 1.25 mm).

WDM System

Figure 10:
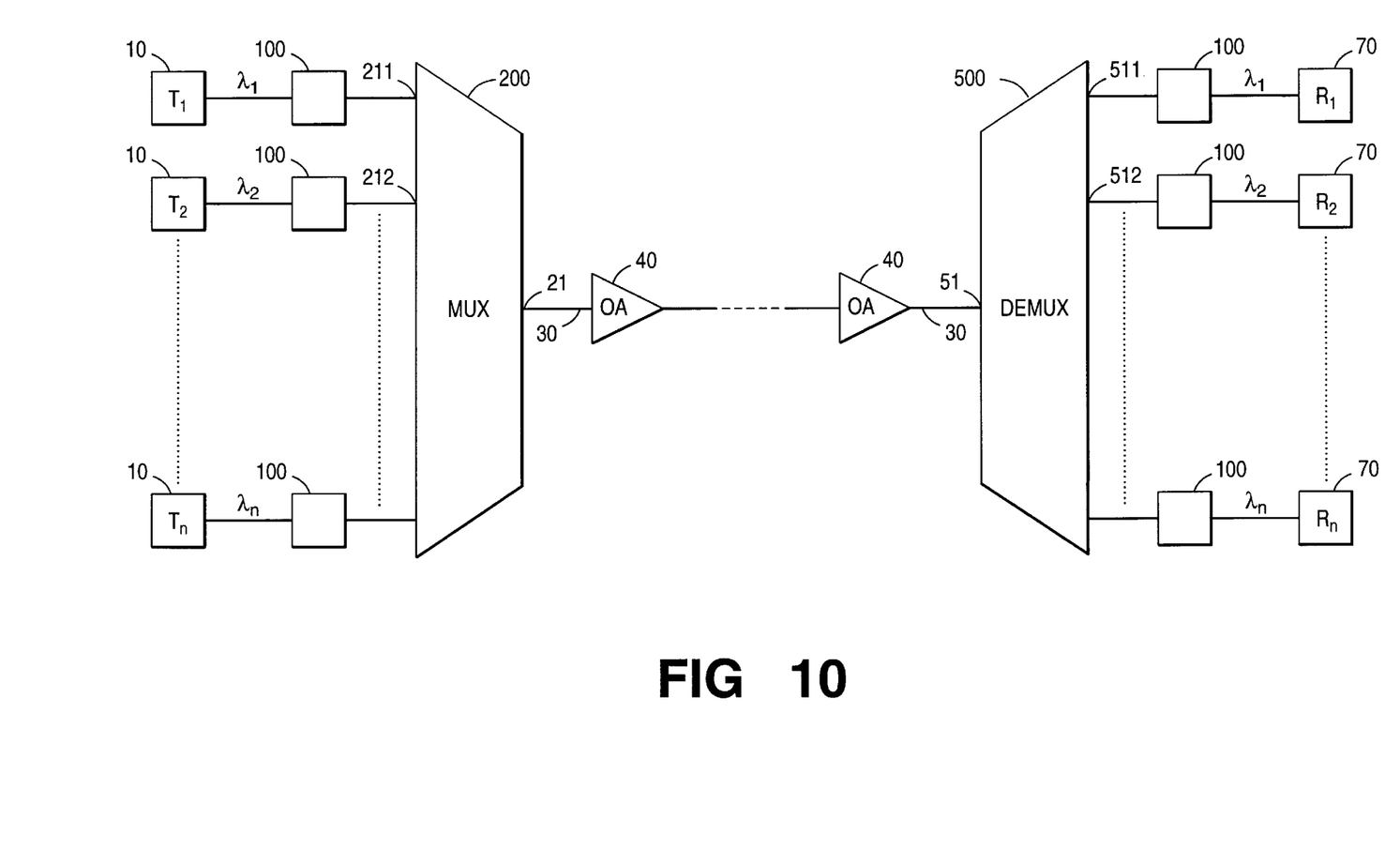
FIG. 10 discloses an optical wavelength-division-multiplexing (WDM) communication system using the air-gap attenuators of the present invention.

As optical communications advance, it is increasingly desirable to transmit more information over a single fiber. Significant advances have been made in the art of combining a number (n) of individual information channels onto the same optical fiber, where each channel comprises a different wavelength region whose central wavelength is designated $\lambda_n$. FIG. 10 discloses an optical transmission system wherein a number of transmitters 10, designated $T_1 \ldots T_n$, supply optical signals in each of n different channels to a multiplexer 200, whose job is to combine the individual optical signals on its input ports 211, 212 . . . and route them to its output port 21, which connects to an optical fiber 30. And while it is generally desirable for the optical power at each input port of multiplexer 200 to be precisely equal, it may also be desirable for the input channels to have different power levels, and optical attenuators 100 provide such control.

The optical transmission system of FIG. 10 includes a demultiplexer 500, which is linked to multiplexer 200 by optical fiber 30 and, possibly, one or more optical amplifiers 40. Demultiplexer 500 separates the individual channels that are simultaneously present on input port 51 and routes them to output ports 511, 512 . . . according to wavelength. These ports are then connected to receivers 70, designated $R_1 \ldots R_n$, which convert optical signals to electrical signals. And while it is generally desirable for the optical power at each output port of demultiplexer 500 to be precisely equal, it may also be desirable for the output channels to have different power levels, and optical attenuators 100 provide such control.

Although various particular embodiments of the present invention have been shown and described, modifications are possible within the spirit of the invention.

What is claimed is:

1. A wavelength-division-multiplexing system including:

plural sources of optical signals having different central wavelengths;

multiplexing apparatus for combining the plurals sources of optical signals onto an optical fiber; and plural optical attenuators positioned between the sources of optical signals and the multiplexing apparatus, each attenuator comprising a pair of cylindrical ferrules that are aligned end-to-end with an air-gap region therebetween, each ferrule having an end face that is adjacent to the air-gap region, each end face including a generally flat surface that forms an angle of about 82° with respect to a central axis of the ferrule, the air separation between the end faces being zero at one point.

2. A wavelength-division-multiplexing system including:

plural receivers of optical signals having different central wavelengths;

demultiplexing apparatus for separating optical signals that are present on an optical fiber into different outputs according to their central wavelengths; and plural optical attenuators positioned between the receivers of optical signals and the demultiplexing apparatus, each attenuator comprising a pair of cylindrical ferrules that are aligned end-to-end with an air-gap region therebetween, each ferrule having an end face that is adjacent to the air-gap region, each end face including a generally flat surface that forms an angle of about 82° with respect to a central axis of the ferrule, the air separation between the angled end faces being zero at one point.

* * * * *